(12) United States Patent
Hall et al.

(10) Patent No.: US 11,003,863 B2
(45) Date of Patent: May 11, 2021

(54) INTERACTIVE DIALOG TRAINING AND COMMUNICATION SYSTEM USING ARTIFICIAL INTELLIGENCE

(71) Applicant: Microsoft Technology Licensing, LLC, Redmond, WA (US)

(72) Inventors: Matthew Brigham Hall, Kenmore, WA (US); Weizhu Chen, Kirkland, WA (US); Junyan Chen, Bellevue, WA (US); Pengcheng He, Sammamish, WA (US); Yu Zhao, Redmond, WA (US); Yi-Min Wang, Bellevue, WA (US); Yuting Sun, Kirkland, WA (US); Zheng Chen, Bellevue, WA (US); Katherine Winant Osborne, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 122 days.

(21) Appl. No.: 16/362,313

(22) Filed: Mar. 22, 2019

(65) Prior Publication Data
US 2020/0302019 A1    Sep. 24, 2020

(51) Int. Cl.
*G06F 40/30*     (2020.01)
*G06N 20/00*     (2019.01)
(Continued)

(52) U.S. Cl.
CPC ......... *G06F 40/30* (2020.01); *G06F 40/205* (2020.01); *G06F 40/295* (2020.01); *G06N 20/00* (2019.01); *G10L 15/22* (2013.01)

(58) Field of Classification Search
CPC ...................................................... G06F 40/30
See application file for complete search history.

(56) References Cited

U.S. PATENT DOCUMENTS 7,487,095 B2 *   2/2009   Hill ..................... G10L 15/1822
                                                                                               704/275
10,664,527 B1 *   5/2020   Henderson .......... G06F 16/3334
(Continued)

FOREIGN PATENT DOCUMENTS

WO     2016033257 A1    3/2016
WO     2018212941 A1    11/2018

OTHER PUBLICATIONS

"International Search Report and Written Opinion Issued in PCT Application No. PCT/US2020/015989", dated May 15, 2020, 10 Pages.

*Primary Examiner* — Shaun Roberts
(74) *Attorney, Agent, or Firm* — Mannava & Kang, P.C.

(57) ABSTRACT

A system for training and deploying an artificial conversational entity using an artificial intelligence (AI) based communications system is disclosed. The system may comprise a memory storing machine readable instructions. The system may also comprise a processor to execute the machine readable instructions to receive a request via an artificial conversational entity. The processor may also transmit a response to the request based on a dialog tree generated from at least a model-based action generator and a memory-based action generator. The processor may further provide a training option to a user in the event the response is suboptimal. The processor may additionally receive a selection from the user via the training option. The selection may be associated with an optimal response.

20 Claims, 11 Drawing Sheets

(51) Int. Cl.
  *G06F 40/205* (2020.01)
  *G06F 40/295* (2020.01)
  *G10L 15/22* (2006.01)

(56) References Cited

U.S. PATENT DOCUMENTS

| | | | |
|---|---|---|---|
| 2004/0193420 A1* | 9/2004 | Kennewick | G06F 16/3329 704/257 |
| 2009/0024598 A1* | 1/2009 | Xie | G06F 16/3349 |
| 2015/0066479 A1* | 3/2015 | Pasupalak | G10L 15/30 704/9 |
| 2018/0101789 A1* | 4/2018 | Soma | G06N 5/022 |
| 2018/0131645 A1* | 5/2018 | Magliozzi | G06F 40/30 |
| 2018/0173999 A1* | 6/2018 | Renard | G06F 40/284 |
| 2019/0042988 A1* | 2/2019 | Brown | G06Q 10/0631 |
| 2019/0058793 A1 | 2/2019 | Konig et al. | |
| 2019/0179901 A1* | 6/2019 | Kataoka | G06F 16/3347 |
| 2019/0182382 A1* | 6/2019 | Mazza | G10L 15/26 |
| 2019/0217206 A1* | 7/2019 | Liu | G06N 20/00 |
| 2019/0311036 A1* | 10/2019 | Shanmugam | G06N 3/006 |

* cited by examiner

INTERACTIVE DIALOG TRAINING AND COMMUNICATION SYSTEM USING ARTIFICIAL INTELLIGENCE

TECHNICAL FIELD

This patent application relates generally to artificial intelligence (AI) based communication systems, and more specifically, to systems and methods for interactive dialog training and communication using AI and example-based creation and construction.

BACKGROUND

Dialog bots are becoming increasingly popular in enterprise and personal environments. For example, organizational entities are using dialog bots (or "chatbots") to transform service delivery. In particular, dialog bots are finding value in several enterprise endeavors, such as marketing and sales, project management, vendor and supplier activities, customer service feedback, troubleshooting, and more.

Although organizational entities are spending large amounts of money and resources to create and deploy dialog bots across various segments to increase efficiencies, there are still several technical problems that continue to persist. One problem, for example, is that most dialog bot systems require editors to curate pre-canned scripts. This generally includes manually developing a dialog tree or flow chart to guide a conversation before publishing the dialog bot to end users. The main problem is that these scripts are fairly static. As a result, these static dialog trees or scripts can grow very large and become quite cumbersome. This conventional approach also presumes that editors of these dialog bots have a deep domain knowledge before authoring these dialogs or scripts, which might not always be the case. In fact, most editors typically do not understand how a conversational model will unfold in a real-world setting, which may further complicate content authoring and minimize real-bot experience.

Another technical problem is the lack of a standardized framework. For instance, a dialog tree or script developed for one implementation (e.g., troubleshooting a product) is often only useful for that single dedicated use. That dialog tree or script may not be used for another implementation (e.g., customer service activity related to another product). In other words, the conventional approach lacks an automated standardized framework to create new dialog bots or update current ones in a more streamlined and efficient way. Conventional dialog bot construction often entails various distinct customizations based on business functions. But because each scenario and use typically has its own set of requirements, it becomes rather difficult to reuse existing dialog bots across different domains when using traditional platforms. It is often a painful effort, then, to recreate another dialog or script for that other use or implementation because it may require either cold start or even for minor changes. Attempts to duplicate development efforts have often led to large amount of rework, all of which reduces efficiencies and overall productivity. Ironically, while dialog bot creation and utilization were intended to help maximize productivity and minimize human effort, conventional systems and methods have unfortunately done the opposite.

Accordingly, a more robust approach for interactive dialog training and communication using AI and example-based creation and construction may be imperative to overcome the shortcoming of conventional systems and methods.

BRIEF DESCRIPTION OF DRAWINGS

Features of the present disclosure are illustrated by way of example and not limited in the following Figure(s), in which like numerals indicate like elements, in which.

DETAILED DESCRIPTION

Figure 1:
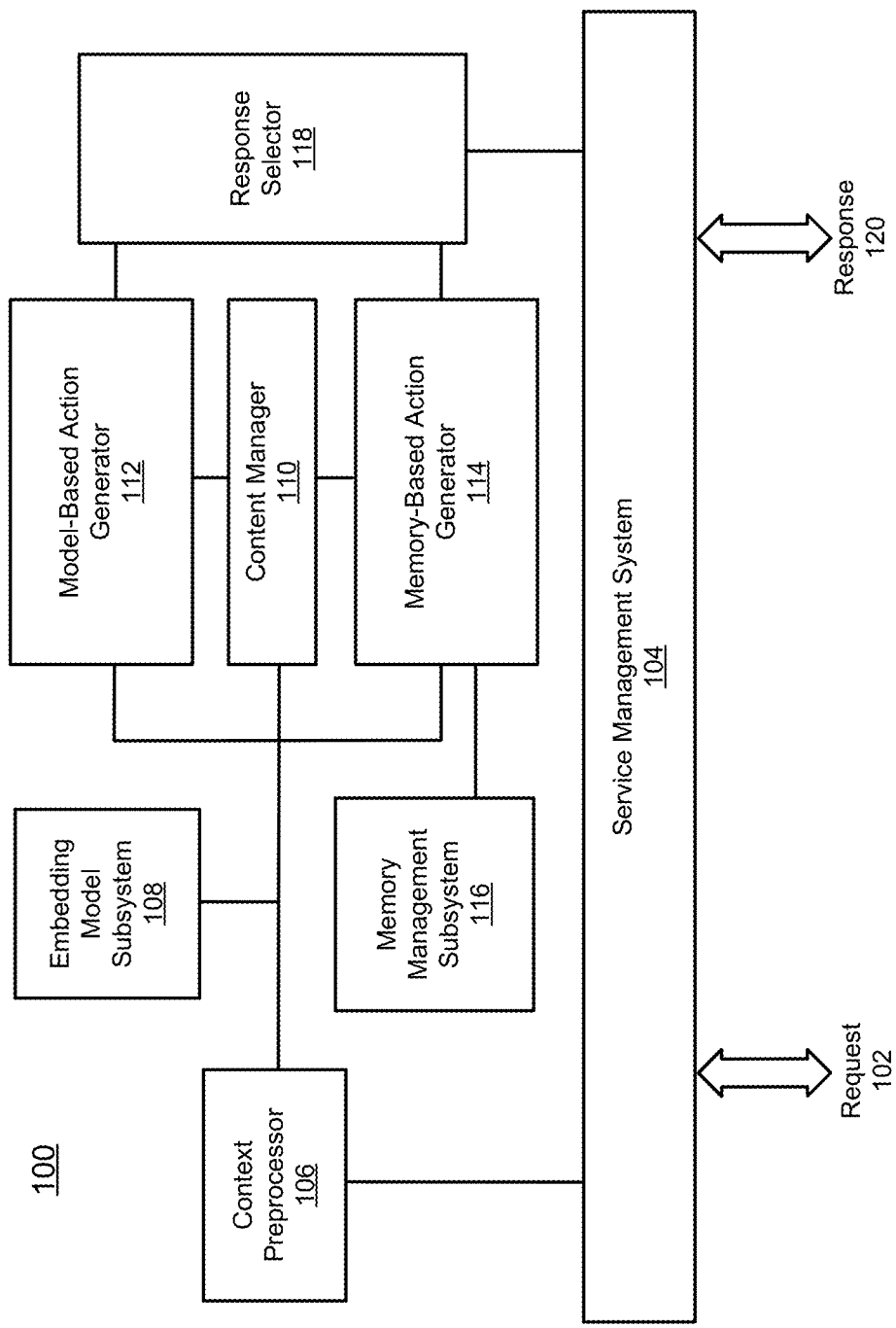
FIG. 1 illustrates a block diagram for an artificial intelligence (AI) based dialog bot training and communications system, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

A dialog bot may have wide applicability in enterprise and personal environments. A dialog bot may be a form of artificial conversational entity that may also be referred to as a chatbot, talkbot, chatterbot, bot, instant messaging (IM) bot, social bot, interactive agent, etc. Although examples described herein are generally directed to "dialog bots," it should be appreciated that the term may include any variety or form of artificial conversational entity.

As described above, the technical challenges facing dialog bots may include manual creation or updates of static dialog trees or scripts, lack of a standardized framework, editing without authentic real-bot experience, and duplication of development efforts. The AI-based interactive dialog bot training and communications systems described herein may overcome these shortcomings and may offer a more dynamic approach that facilitates service delivery and increases efficiency.

A dialog bot may be created and constructed in several phases. These phases may include design, build, analytics, and maintenance. Dialog bot design may include the process that defines interaction between user and dialog bot. For example, a designer may shape a dialog bot personality by configuring type of questions to be asked, overall interaction style, etc. Artificial intelligence may be used to shape human-machine interaction in a way that makes it intuitive and natural. Design and testing may be similar to that of design and testing graphical user interfaces or other similar interface.

Dialog bot build phase may be divided into understanding user's intent and producing the correct answers/responses to user queries. In other words, the first part may involve understanding user input. Using artificial intelligence, a dialog bot may be built around a conversation using textual, auditory, or visual techniques. Such artificial intelligence may rely on computer hardware and software to convincingly simulate how a human would behave as a conversational partner. As a result, a dialog bot may use content preprocessing (cache) or sophisticated natural language processing (NLP) systems, or other various techniques that involve machine learning, language translation, keyword scanning, pattern recognizing, clustering, and/or other AI-based or related techniques.

Dialog bot analytics may allow a dialog bot ability to take a wealth of information from a variety of data sources (e.g., Internet of Things (IoT), enterprise databases, etc.) and help monitor or spot potential flaws or problems. Dialog bot analytics may also help improve human-machine interaction and overall user experience. Dialog bot maintenance may help update dialog bots according to current products and services. Artificial intelligence may help with self-learning, which may help reduce costs associated with required ongoing maintenance. Editors and various training techniques may be involved in all these phases.

As described herein, improved techniques for artificial intelligence (AI) based interactive dialog training and communications system may be provided. Rather than relying on a pre-curated authoring approach, the artificial intelligence (AI) based interactive dialog training and communications system described herein may provide a more dynamic solution that utilizes an example-based alternative to build and train a dialog bot incrementally. The artificial intelligence (AI) based interactive dialog training and communications system may enable one or more editors to interact with the dialog bot using real or synthesis examples. For example, an editor may alternate between the role of an end user and the role of a teacher. Furthermore, the editor may be able to correct or teach a suboptimal dialog bot one or more optimal responses. This teaching knowledge may be consumed by a conversational model, for example, and may be generalized into similar unknown conversational examples for further use across a variety of domains.

The advantage of this approach is clear. The artificial intelligence (AI) based interactive dialog training and communications system, as described herein, may provide a more natural interface for training a dialog bot. For example, rather than writing a static script or dialog tree, an editor may dynamically and directly interact with a dialog bot in the same or similar manner to that of any user interacting with the dialog bot. If answer or response is incorrect or suboptimal, the editor may change that answer with a better answer directly with the artificial intelligence (AI) based interactive dialog training and communications system. In this way, the editor may "train" or "teach" the dialog bot in a real conversational setting not afforded by conventional or traditional systems. The artificial intelligence (AI) based interactive dialog training and communications system may therefore provide a more convenient way to fix any dissatisfied response in a production system. It may also initiate a dialog bot, or other similar artificial conversational entity, and minimize the amount of time in authoring. Additionally, the teaching experience may be the same, or nearly the same, as the end user experience.

Thus, the artificial intelligence (AI) based interactive dialog training and communications system may provide greater user control and accessibility and allow any editor—with or without domain knowledge or real-bot experience—to provide meaningful content authoring. All of this may further reduce development effort, improve functionality, enable cost and time effectiveness, and increase customer retention and engagement.

FIG. 1 illustrates an architecture for an artificial intelligence (AI) based dialog bot training and communications system 100, according to an example. The AI-based dialog bot training and communications system 100 may be used to interactively train a dialog bot. In particular, the AI-based interactive dialog bot training and communications system 100 may provide ability for a user at an enterprise, for example, to train an artificial conversational entity with high efficiency and customizations. The AI-based interactive dialog bot training and communications system 100 may store information or be able to receive information from memory and/or various data sources, as well as leverage artificial intelligence (AI) and other related machine learning techniques to create automated instances of dialog bots for user experience and service and other related human-computer interactivity. For example, the AI-based interactive dialog bot training and communications system 100 may use, among other things, natural language processing, interactive user interface, multi-lingual support, smart integration, visual/audio support, and/or other analytics and AI-based techniques to provision, build, and train dialog bots.

The AI-based interactive dialog bot training and communications system 100 may operate in a network or an enterprise environment where data is exchanged, and where products or services are being offered to customers. Furthermore, the AI-based interactive dialog bot training and communications system 100 may also provide real-time or near real-time monitoring and analysis of data exchange and data storage, as well as an artificial intelligence (AI) system that could be used in all aspects of design, building, provisioning, analytics, and maintenance of dialog bots.

In some examples, the AI-based interactive dialog bot training and communications system 100 may receive a request 102 and/or transmit a response 120 via a service management system 104, which in turn may coordinate with a variety of other enterprise elements, such as a context preprocessor 106, an embedding model subsystem 108, a content manager 110, a model-based action generator 112, a memory-based action generator 114, a memory management subsystem 116, and a response selector 110, to provide build, and train a dialog bot.

The service management system 104 may receive and/or transmit a variety of communications, such as a request 102 or a response 120, for interactive training and provisioning of a dialog bot. For example, the service management system 104 may handle a variety of queries from users interacting with a dialog bot. In one example, this may come from real end users with genuine queries or from editors seeking to train the dialog bot. These queries may be received by the service management system 104 via a request 102, and passed to various downstream components of the AI-based interactive dialog bot training and communications system 100.

The context preprocessor 106 may collect and pre-process a variety of communications or queries from the service management system 104. For example, the context preprocessor 106 may examine the text of the query (e.g., request 102) from a user or editor interacting with a dialog bot to extract useful features of the request 102. The context preprocessor 106, for example, may determine user conversational context based on the request 102 of the user or editor received from the service management system 104. It should be appreciated that context may be defined as information associated with a running conversation, including initial user query, background information associated with the conversation, entity information, multi-turn utterances between user and a dialog bot, etc.

In some examples, the context preprocessor 106 may extract context of the query using a variety of data processing techniques. One technique may include caching, which allows the context preprocessor 106 to "look" at request 102 and extract key components of the query. It should be appreciated that natural language processing (NLP), or other data processing techniques, may also be used to parse the query. For example, NLP may be used to analyze, understand, and derive meaning from human language from the query. In other words, NLP may leverage AI to enable the context preprocessor 106 to provide or extract context from the request 102. It should be appreciated that NLP may involve defining entities and a variety of NLP and non-NLP techniques may be employed at the AI-based interactive dialog bot training and communications system 100.

The embedding model subsystem 108 may receive the communication or query from the context preprocessor 106 and associate a numerical vector to the preprocessed request context. In other words, the embedding model subsystem 108 may use a contextual embedding model to produce a context-aware embedding (e.g., numerical value) to represent context of a running conversation with the dialog bot. In some examples, this may be based on the context and may be achieved using an AI-based technique or deep learning model. More details on the contextual embedding model will be provided below.

Once the communication or query has been assigned an embedding or numerical vector, the model-based action generator 112 and/or the memory-based action generator 114 may work in parallel to prepare a reply to the request 102.

The model-based action generator 112 may take the embedded user query (e.g., numerical value/vector) and compare it to embedded values of action content. With the help of the content manager 110, the model-based action generator 112, for example, may find similarities with action content that editors have previously written. Similarities may be determined using a similarity comparison technique. In some examples, the similarity comparison technique may include cosine similarity, classification, or other similarity comparison technique.

In some examples, the content manager 110 may load existing curated content (such as dialog scripts and knowledge) and extracted actions, such as the slot-based questions, clarification questions and solutions, or other similar actions. This may enable the AI-based interactive dialog bot training and communications system 100 to identify and prepare the best response to the query or request 102 based on the similarity comparison.

The memory-based action generator 114 may also take the embedded user query (e.g., numerical value/vector) and compare it to "lessons" stored in memory, including the content manager 110 or memory management subsystem 116. In essence, the memory-based action generator 114 may take user query values and compare it to "lessons" completed via an interactive teaching interface, which is described in more detail below. If an editor interacting with the dialog bot receives a wrong or suboptimal reply to his or her initial query during a training session, the editor may teach or retrain the dialog bot with the correct answer, and all of this may be saved in memory as a "lesson," from which the memory-based action generator 114 can draw upon in the future. It should be appreciated that the memory-based action generator 114 may also use a similarity comparison technique or other technique.

It should be appreciated that in examples involving interactive dialog bot training, editors may be involved in the processes taken by the model-based action generator 112 and/or the memory-based action generator 114.

The response selector 118 may select a response from the above rankers according to their confidence score. Typically, the response 120 with the highest weighted score will be selected. However, this is not always the case since ranking these responses may include considering other factors as well. The response selector 118 may then transmit the response to the service management system 104, which in turn may send the response 120 to the user or editor via an interface.

Figure 2:
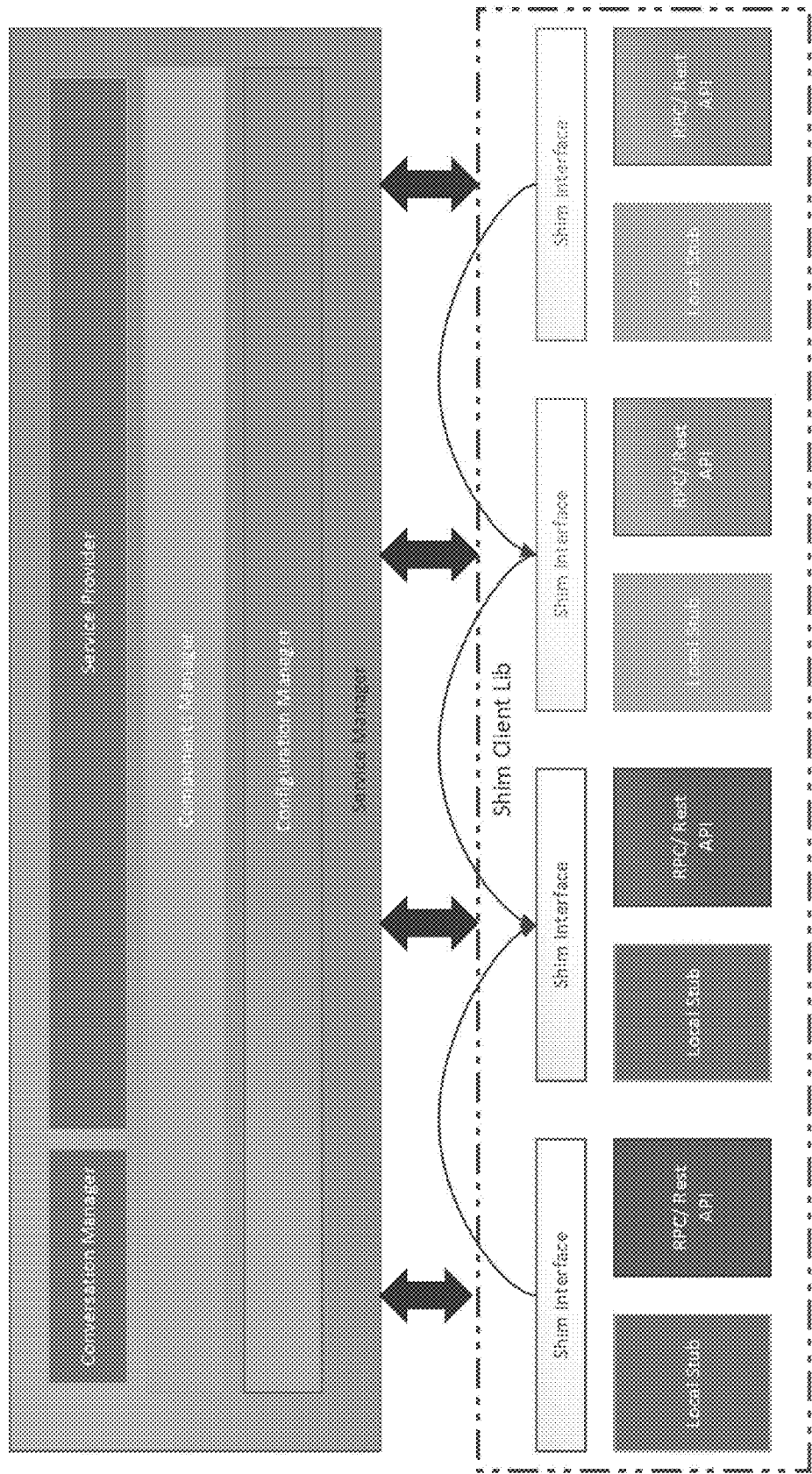
FIG. 2 illustrates a block diagram for a service management system of an artificial intelligence (AI) based dialog bot training and communications system, according to an example.

FIG. 2 illustrates a block diagram for a service management system 104 for an artificial intelligence (AI) based dialog bot training and communications system 100, according to an example. As shown, the service management system 104 may include various elements, such as a conversation manager, service provider, components manager, and a configuration manager. The service management system 104 may also interact with a shim client, having a plurality of shim interfaces, local stub, and APIs. In some examples, the service provider may handle incoming requests and sends outgoing responses. In other words, the service provider may function as an external web interface of the service. The components manager may handle instantiating and/or managing a library of components (e.g., components are units of functionality such as the embedding model subsystem 108 model-based action generator 112, etc.). The configuration manager may handle loading a configuration of components that defines the service as a whole. It should be appreciated that each component may have multiple versions, and the configuration may specify which was loaded and how they were strung together. For example, embedding model system A may link to model based action generator B. The shim client library components may either be instantiated as local components (e.g., running in the same process as the service) or remote (e.g., running as a microservice). This library may allow seamless communication with the components in either scenario.

With regard to the contextual embedding model, user conversational content may be converted to a numeral vector or value, which may be used in a similarity comparison, as described above. It should be appreciated that, in some examples, model training of the contextual relevance model may be progressive. Here, human conversational data with various existing question-answer pairs may be used initially to train a base model and iterate on top of that. With the base model, interactive teaching efforts may be used to build a multi-turn conversational bot. Meanwhile, this teaching data may be used as evaluation data to retrain the model. Various network structures may be used and a report with evaluation may be generated. For the evaluation, the teaching data may be used as a foundation or baseline (e.g., ground truth) and may be formalized as a ranking problem to report. In other words, such a contextual model may be something that can be improved with more and more training and evaluation data. It should be appreciated that there may be some complementary training actions performed to improve the model. For example, these may include utterance clustering, utterance functional role detection, or other similar techniques.

Figure 3A:
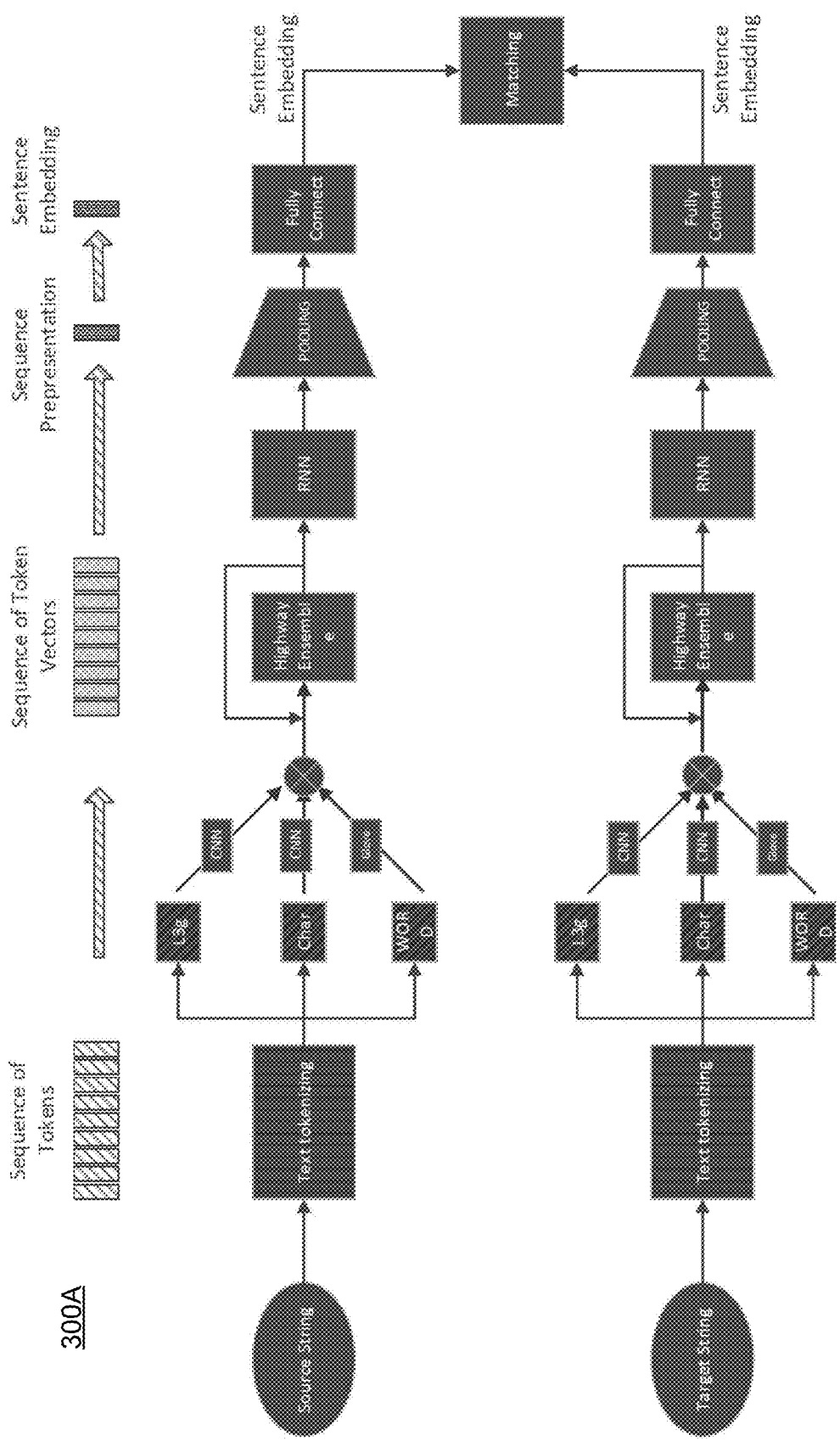
FIG. 3A-3C illustrate a deep learning model for an artificial intelligence (AI) based dialog bot training and communications system, according to an example.
Figure 3B:
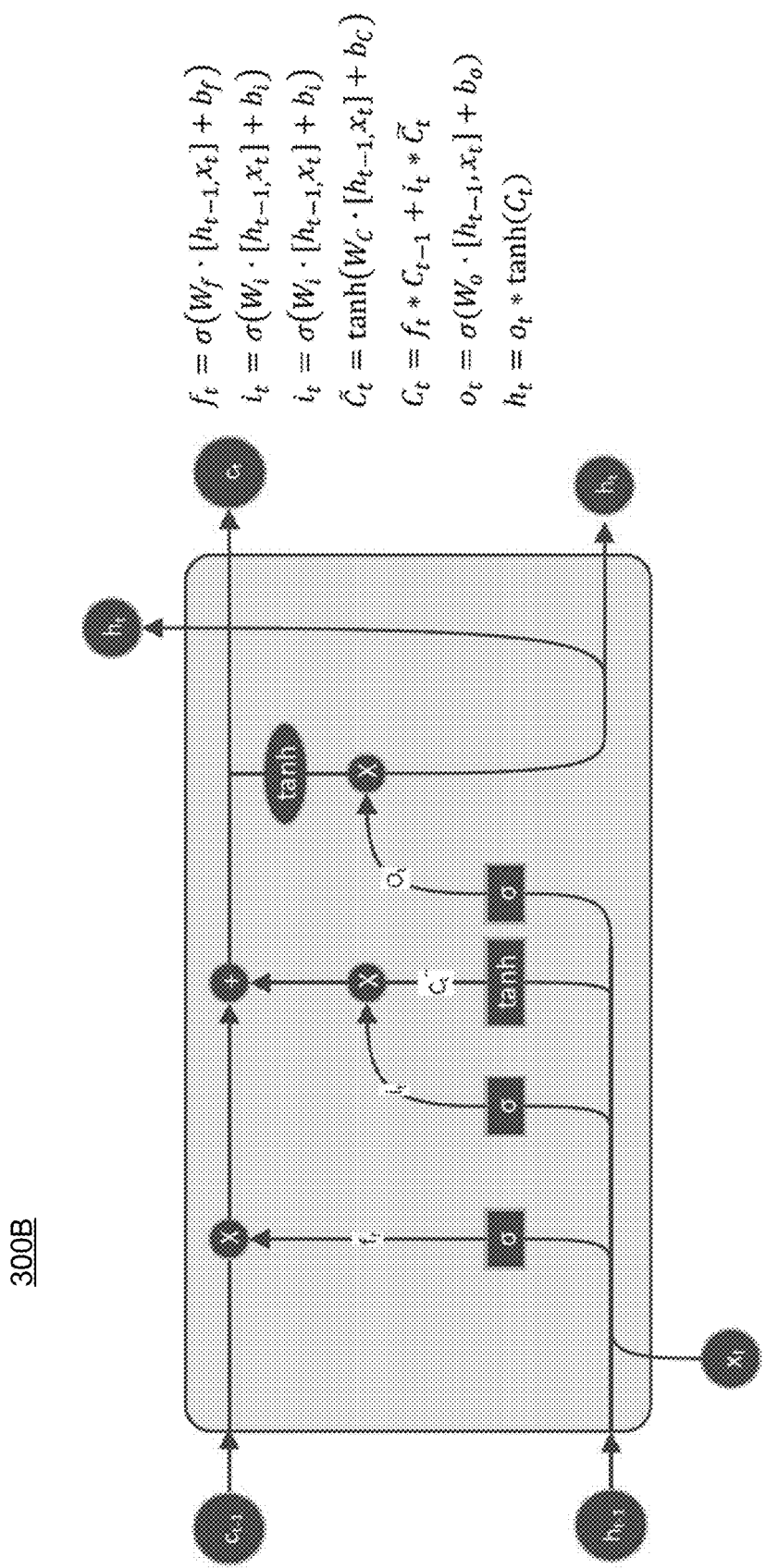
Figure 3C:
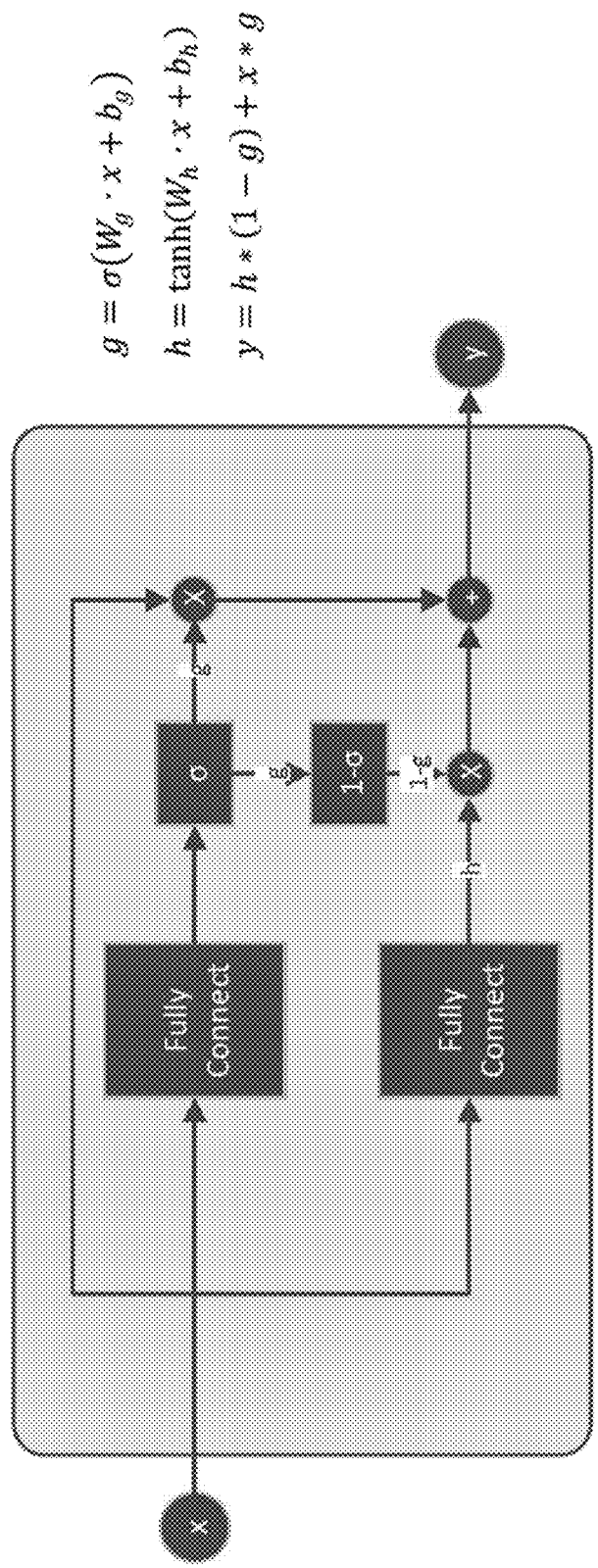

FIGS. 3A-3B illustrate a deep learning model 300 for an artificial intelligence (AI) based dialog bot training and communications system 100, according to an example. This deep learning model may provide one way to perform the contextual embedding model and assign a numerical vector or value for conversational content in the query. It should be appreciated that the source string may be 'tokenized' (e.g., broken into tokens at word and character boundary) and then converted to corresponding vectors via CNN (convolutional neural network) model or Glove Embeddings. The sequence of tokens vectors may be run through an RNN (recurrent neural network) pooled to create a sequence representation. The representation may then be connected to produce a final sentence embedding. Source sentence embedding is compared to target sentence embedding to produce a match score. Other various examples and implementations may also be provided.

Given a running conversation, the task of the contextual embedding model may be to rank all feasible actions according to the conversational context. The contextual information and all the feasible actions may be used as input to the contextual embedding model in inference, and the output of the model may be assigned a score for each action. This may help achieve a ranking task.

There may be three interfaces in the model. The first, for example, may be to produce an embedding for a context and this embedding may be used as a key for matching. The second interface may produce an embedding for each action. The third may produce a similarity score for each embedding pair, where one is generated from the first interface and the other is generated from the second interface. As a combined interface, the model-based action generator 112 may be able to generate and/or rank all feasible actions, given a running context. It should be appreciated that this ranker may also interact with the content manager 110 to load and update all existing actions to ensure the latest content is available. Right after each teaching, the model-based action generator 112 may use the updated action for either teaching or serving within seconds. Other various actions may also be provided.

The memory-based action generator 114 may take editor/expert knowledge and rank response/action based on information stored in memory, e.g., coordinated by the memory management subsystem 116. By introducing this type of memory into the system 100, the end-to-end interactive experience may become more interpretable and editable. At the same time, the memory may be used to fix any dissatisfactory set (DSAT) and generalize to similar cases conveniently and immediately. It should be appreciated that in some examples, the memory may still rely on the contextual embedding model but may also be treated as a complement to the model-based action generator 112.

In some examples, a memory table may be used by the memory-based action generator 114 and/or the memory management subsystem 116. The memory table, for instance, may be treated as a lot of key-value pairs. Here, an embedding vector may be used to help capture many similar contexts, and value may represent an action as a next response by the dialog bot accordingly. Meanwhile, a list of associative contexts may be used to produce this key. Overall, the memory table may support various basic operations, including retrieval, insert, delete, update, split, rebuild, and/or other similar functions.

During retrieval stage, for example, the memory-based action generator 114 may calculate the similarity in terms of the embedding vector between the running context and keys in the system, and then pick up the closest key as the retrieved key and return its corresponding action. A threshold may be maintained for the retrieval (such as 0.9), so the retrieval operation could return a list of actions whose similarity scores are above the threshold.

When inserting a new context-action pair to memory via teaching, the embedding of the context may be used to produce a key. The system 100 may then find a list of same key-action pairs that has the same action as the input action. If there is no existing action in the memory, it may first insert the new context-action as a new key-value in the memory. If a close key cannot be found with the exact same action in the memory, a similarity between the running context with the closest key is above a threshold (such as 0.9) may be determined. If below a threshold, the new context-action may be added as a new key-value in the memory. Otherwise, this key may be updated instead of inserting a new key into the memory.

It should be appreciated that this update may include multiple steps and may be atomic. For example, given existing embedding of new context may be represented as $c_{n+1}$ with its embedding as $v_{n+1}$, it may be assumed there are n associative context $c_1, c_2, \ldots, c_n$ and their embedding may be $v_1, v_2, \ldots, v_n$ in current key. In our current design, constraint may be represented as $$v = \frac{1}{n}\sum_{i=1}^{n} v_i,.$$

In other words, the value of the key may be the average of the embedding in its associative context list. Here, it may be helpful to add $v_{n+1}$ into the average to produce a $$v_{new} = \frac{1}{n+1}\sum_{i=1}^{n+1} v_i,$$

and then calculate the similarity between each $v_i$ and $v_{new}$ to see if the similarity is still above a threshold (this may be a weak constraint, as a strong constraint may ensure $v_{new}$ is still the best key for each $v_i$), since the new average may not guarantee that it is still the closest to all contexts (including the new context) associated with the key. If this constraint is still true, we may use $v_{new}$ to replace v as the new key and add $c_{n+1}$ and $v_{n+1}$ into the list of its associative context and embedding. Otherwise, to achieve previous constraint, this key may be split with its associative context into two separate items in the memory.

A simple, efficient but sub-optimal approach for key split may be to create a new key just for the new context. Alternatively, rebalancing the context in both keys by moving some context from one key to the other may be provided. Also, updating both keys based on their new context assignment may be another option.

A teaching interface may decide to delete some existing context-action pair, which means this exact context-action pair may need to be found or located in the memory. If found, the memory may be updated, including the key and its associative context list in the memory. Similar to what has been described above, the constraint may be checked after each deletion and a memory key split may result if the constraint is violated. If this exact context-action pair cannot be found from the memory, it may be assumed that this pair has been consumed into the model in a previous model update and is no longer necessary to update in the memory. There may be two related efforts to consider for this scenario. If the exact context should relate to a different action, editors or teachers may add a new context-action pair and call the previous insert operation. The combination between the insertion and deletion may be used together for an action update operation. On other hand, introducing the action mask may be considered in order to disable some action if editors or teachers explicitly tell the system 100 this is a DSAT.

It should be appreciated that the whole memory table may be relying on the contextual embedding model. While the model is updated, the entire memory table may be rebuilt. On the other hand, the memory may be used as the complement to the model since both will produce candidates for the response selector. Thus, if the model could already produce the right action for a given context, it may not be necessary to add this context and its action into the memory. Also, the memory data may be added as part of its training data, which may significantly reduce the memory to a maintainable size.

Editors may teach the bot interactively using a dialog bot simulation interface. Editors can change how a bot responds to a specific query or conversation. When an editor teaches the bot a correct response, that information may be stored as a lesson and built into a memory. These memories are then used during the ranking flow to generate action candidates.

The current solution may use similarity scoring of sentence and conversational embeddings to decide if the user's query matches any of the lessons stored in the memory manager. Rather than similarity scoring, other methods may also be used.

One way would be to treat the problem as a classification problem, where each action was a potential solution. Using the stored lessons, a model may be trained to classify the user query as matching one of the actions, or no action. On each teach update that adds a new lesson to the memory, the model may be retrained and the classification process may be updated.

Figure 4:
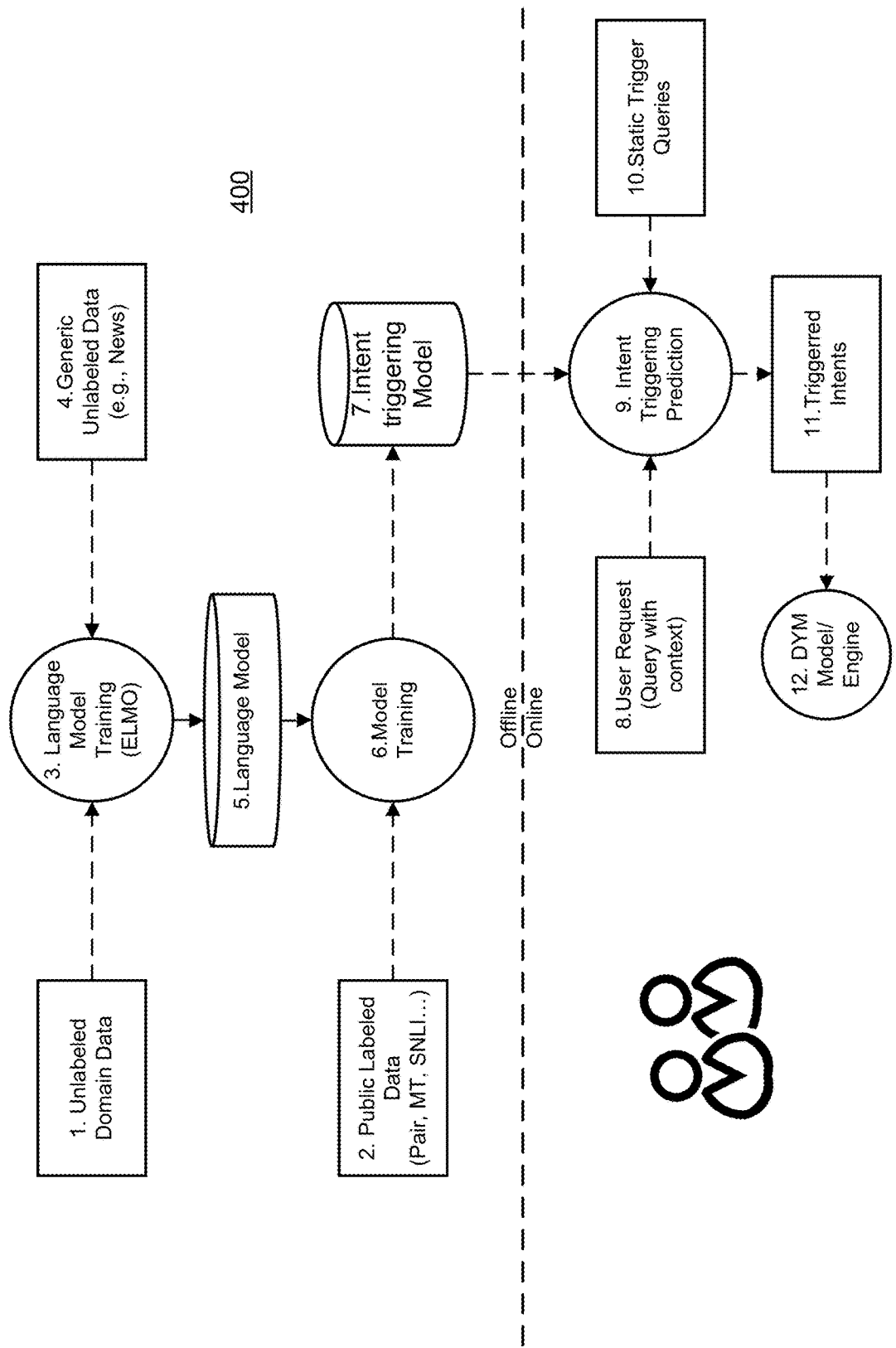
FIG. 4 illustrates a block diagram and data flow for intent triggering in an artificial intelligence (AI) based dialog bot training and communications system, according to an example.

FIG. 4 illustrates a block diagram and data flow for an intent triggering pipeline 400 in artificial intelligence (AI) based dialog bot training and communications system 100, according to an example. As shown, intent triggering pipeline 400 in an artificial intelligence (AI) based dialog bot training and communications system 100 may include an offline model training and/or in an online model serving, as shown. The offline training part may focus on building a domain-specific model with or without various input data. The online training part may capture how to leverage the trained model along with the trigger queries to build the user-facing service.

A successful training process may come with training data. It should be appreciated that there may be two kinds of training data. The first may be labeled data, which assigns some additional information to an example. In some cases, this may require manual input to prepare. The second may be unlabeled data, which may not provide any labeling information for the target problem. Although labeled data may be informative and helpful since they are typically designed with purpose, there may be certain limitations that come with labeled data. One such limitation, for example, may be availability. A process involving a human in the loop may be inefficient or cumbersome when dealing in terms of scalability and quick adaptation. For instance, hiring people to label data may be extremely costly and slow in terms of high-quality data accumulation.

Another limitation may be adaptability. When a problem definition evolves, labeled data may become stale or require significant effort keep the data up-to-date. For example, when intents are added or deleted, labeled data may need to be updated in order to reflect this change.

Referring to FIG. 4, training data used in intent triggering may involve a combination of both unlabeled data (1) and labeled data (2), as shown. In general, labeled data (2) may come from public and external data sources, and may have following properties:

They may be labeled for other tasks or purposes, but their labeled information may be informative to learn a semantic representation for our intent triggering task.

Since the data sources consist of multiple sources, such as books, news, and other sites or sources, the data may have captured various topics. Thus, application to intent triggering may be provided in several different domains.

Amount of the data may be large and at zero to minimum cost

In some examples, such data may come from systems, subsystems, applications, and/or interfaces, such as from enterprise resource planning (ERP) systems and applications, documents, web feeds, machine and sensor data, and geolocation data, all of which may be distinct or integrated with the AI-based interactive dialog bot training and communications system 100. It should be appreciated that each of these data sources may further include its own data feed, storage, system, application, or other source for collecting and sending data and information, including third party or indirect sources.

On the other hand, for a specific domain, there may be a lot of domain-specific vocabulary and documents that may be leverage into the model. The size of this content may be large but there may be no associated labeled information. It may therefore be important to train a language model using these domains-specific text to capture the distributions of sequence of words in the specific domain. When there is no sufficient domain specific text, combining it with other generic unlabeled data (1) to train this language model may be possible. As shown, an embeddings from language model (ELMO) (3) may be used for language model training, which may be particularly effective in machine reading comprehension.

In the next step, a language model (5) will be used with the public labeled data to train a deep learning model. The general approach of consuming a language model (5) may be to produce a contextualized embedding for each word in the labeled data. This contextualized embedding may be used with other text-based features as the input to our neural network for training, which may finally produce our deep learning-based intent triggering model (6).

It should be appreciated that the offline training process may be totally unaware of the intent definition or their trigger queries (7). This may provide at least the advantage of flexibility. For any intent modification, it may not be needed to retrain the model. Even for different customers with varied intents but under the same or similar domains, the same model may be used since none of our previous model training step involve any customer-specific data.

For the online part, online triggering service may rely on two inputs. One input may be the model trained offline (7). The other may the intent definition with its trigger queries (10). When the intent triggering service (9) receives a user request containing a user query (8), it may use the model to calculate the similarity between user query and all trigger queries in all intents, which may result in a similarity score between the user query and each trigger query, as described herein. These scores may then be used to rank all the intents. Generally, the maximum score among an intent's trigger queries may be the score to represent the intent. It should be appreciated that top-K intents with the highest scores (11) may be produced for the next Do-You-Mean or Did-You-Mean (DYM) component (12).

The DYM component (12) may take the top intent list as candidates and may determine how to interact with a user. There may be multiple actions from which the DYM component (12) may select. For example, the DYM component (12) may decide to directly trigger an intent or not trigger any intent. The DYM component (12) may also decide to ask the user clarification questions using intent names as candidates. It should be appreciated that there may be two kinds of classification questions. One may be a binary question with "Yes" and "No" as answers with only one candidate. The other may be a multi-choice question asking the user to pick one of the candidates or "None of the Above." After this optional interaction, the system 100 may affirm a user's selection and move on.

Improving intent triggering may be an important part of the artificial intelligence (AI) based dialog bot training and communications system 100, especially for dialog training. For example, intent triggering may be helpful in intent hierarchy, model retraining, structural intent triggering, context-aware triggering, etc. Intent triggering may involve comparing static trigger queries (FIG. 4, item 10) to incoming user queries (FIG. 4, item 8) to produce a triggered intent candidate if there is a match. An intent may then be matched to a corresponding dialog which the box executes. In system 100, a user query may be compared to actions via the model-based action generator 112 and lessons via the memory-based action generator 114 to produce action candidates. An action may be directly and/or discretely actionable by the dialog bot, and may not need to be mapped to any entire dialog. In this way, action triggering may be achieved rather than just intent triggering. It should be appreciated that action triggering system may be retrofitted into an intent triggering system in the event actions are also correlated to intents.

Although not depicted, all the components in the artificial intelligence (AI) based dialog bot training and communications system 100 may collect, manage, process, and analyze information and data within general control of an enterprise, such as an organizational entity conducting operations, business, or other related activities, the artificial intelligence (AI) based dialog bot training and communications system 100 may design, build, and deploy and provide analytics and maintenance of dialog bots that collect, manage, process, and analyze information and data. In order to do this, the artificial intelligence (AI) based dialog bot training and communications system 100 may include one or more data stores, one or more servers, and other elements to process data for its organizational purposes. For example, the artificial intelligence (AI) based dialog bot training and communications system 100 may include a data management store, an operational data store, and an enterprise data store.

The data management store may store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource.

The operational data store may store information and data associated with operational reporting, controls, and decision-making. The operational data store may be designed to integrate data from multiple sources for additional operations on that data, for example, in reporting, controls, and operational decision support. Integration of data at the operational data store may involve cleaning, resolving redundancy, checking against business rules, and other data integration techniques, such as data virtualization, federation, and extract, transform, and load (ETL). The operational data store may also be a source of data for an enterprise data store, which may be used for tactical and strategic decision support.

The enterprise data store may store information and data associated with reporting and data analysis, and may be instrumental to various business intelligence functions. For example, the enterprise data store may be one or more repositories of integrated data (e.g., from the operational data store) and used to store current and historical data and to create analytical report(s) for advanced enterprise knowledge. Data passed through the enterprise data store may also involve cleansing to ensure data quality and usage. ETL may also be used, as well as other techniques, involving staging, data integration, and access features. Ultimately, data in the enterprise data store may be transformed and catalogued so that it may be used for data mining, analytics, and other business intelligence purposes, such as marketing, decision support, etc. Other data stores may also be provided, such as data marts, data vaults, data warehouses, data repositories, etc.

It should be appreciated that the data stores described herein may include volatile and/or nonvolatile data storage that may store data and software or firmware including machine-readable instructions. The software or firmware may include subroutines or applications that perform the functions of the system 100 and/or run one or more application that utilize data from the system 100. Other various server components or configurations may also be provided.

The artificial intelligence (AI) based dialog bot training and communications system 100 may further include a variety of processors, computing components, and/or servers, in addition to those shown in FIG. 1, that facilitate, coordinate, and manage information and data. For example, these servers, as well as others described herein, may include any number or combination of the following servers: exchange servers, content management server, application servers, database servers, directory servers, web servers, security servers, enterprise servers, and analytics servers. Other servers to provide data security and protection may also be provided.

Each of these elements may comprise a computing component, such as a server. It should be appreciated that while described as a single server or integrated computing component, each of these elements may also include other various components within the systems, layers, and subsystems of the AI-based interactive dialog bot training and communications system 100, as described herein. For example, it should be appreciated that multiple servers or integrated computing components may be used for each of these servers, which in turn may be connected via one or more networks. Also, middleware (not shown) may include in the AI-based interactive dialog bot training and communications system 100 as well. The middleware may include software hosted by one or more servers, or it may include a gateway or other related element. Furthermore, it should be appreciated that some of the middleware or servers may or may not be needed to achieve functionality. Other types of servers, middleware, systems, platforms, and applications not shown may also be provided at the back-end to facilitate the features and functionalities of the AI-based interactive dialog bot training and communications system 100.

The artificial intelligence (AI) based dialog bot training and communications system 100 may also include various layers, processors, systems or subsystems. For example, the artificial intelligence (AI) based dialog bot training and communications system 100 may include various interfaces (not shown). The interfaces may be any number of hardware, network, or software interfaces that serves to facilitate communication and exchange of data between any number of or combination of equipment, protocol layers, or applications. For example, a network interface may be provided to communicate with other servers, devices, components or network elements via a network in the AI-based interactive dialog bot training and communications system 100. Other layers, processing components, systems or subsystems, or analytics components may also be provided. Features and functionalities may be particularly helpful in data management and machine learning.

There may be many examples of hardware that may be used for any of the servers, layers, subsystems, and components of the AI-based interactive dialog bot training and communications system 100 described herein. For example, any processor, server, or computing element may be or include an integrated circuit, and may execute software or firmware or comprise custom processing circuits, such as an application-specific integrated circuit (ASIC) or field-programmable gate array (FPGA).

It should be appreciated that a layer as described herein may include a platform and at least one application. An application may include software comprised of machine-readable instructions stored on a non-transitory computer readable medium and executable by a processor. The systems, subsystems, and layers shown in FIG. 1 or other figure may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

The AI-based interactive dialog bot training and communications system 100, as described herein, may provide several additional benefits and advantages over conventional techniques. For example, the AI-based interactive dialog bot training and communications system 100 may leverage power of artificial intelligence and other features to provide users with ease of training and interaction with dialog bots. In some examples, natural language processing (NLP) may provide human-like conversations and understanding. The AI-based interactive dialog bot training and communications system 100 may also provide dialog bots with interactive user interfaces that provide a seamless user experience. The AI-based interactive dialog bot training and communications system 100 may also provide multilingual support, which allows creation of and interaction with dialog bots in a global platform. The AI-based interactive dialog bot training and communications system 100 may also provide speech-to-text or text-to-speech techniques, as well as other multimodal ways to create and interact with users—internal, external, or otherwise. Smart integration may also give dialog bot ability to provide informed responses based on a wealth of various data sources, such as existing customer website, documents, various databases, $3^{rd}$ party ticketing systems, social media, etc.

Auto-correction and user dictionaries may also be provided. Here, user input verification may be used to correct user statements and inputs. A custom dictionary for a set of common reference words may be provided to better understand a user's intent during a conversation. This may help provide the most natural and logical response to user queries. Furthermore, the AI-based interactive dialog bot training and communications system 100 may provide a user the ability to select context of discussion from a list of available functions, not to mention a feedback mechanism for responses provided by the dialog bot. Such feedback may be useful for training dialog bots and improve future results and responses. It may also be possible to configure a limited lifespan for each dialog bot, as well as store entire conversations for future reference and/or training.

The AI-based interactive dialog bot training and communications system 100 may be platform independent. In other words, dialog bots created by the AI-based interactive dialog bot training and communications system 100 may be created and/or deployed across various platforms, such as Windows, MAC, Unix, or other operating systems. Dialog bots created by the AI-based interactive dialog bot training and communications system 100 may also be hosted in the cloud, provisioned/accessed via the web, or provided locally/remotely via on-site premises.

Ultimately, the AI-based interactive dialog bot training and communications system 100 may provide a more robust and comprehensive approach for artificial intelligence (AI) based communications system that reduces development effort, improve functionality and customer experience, provides greater user control and accessibility, and enables cost and time effectiveness.

Figure 5A:
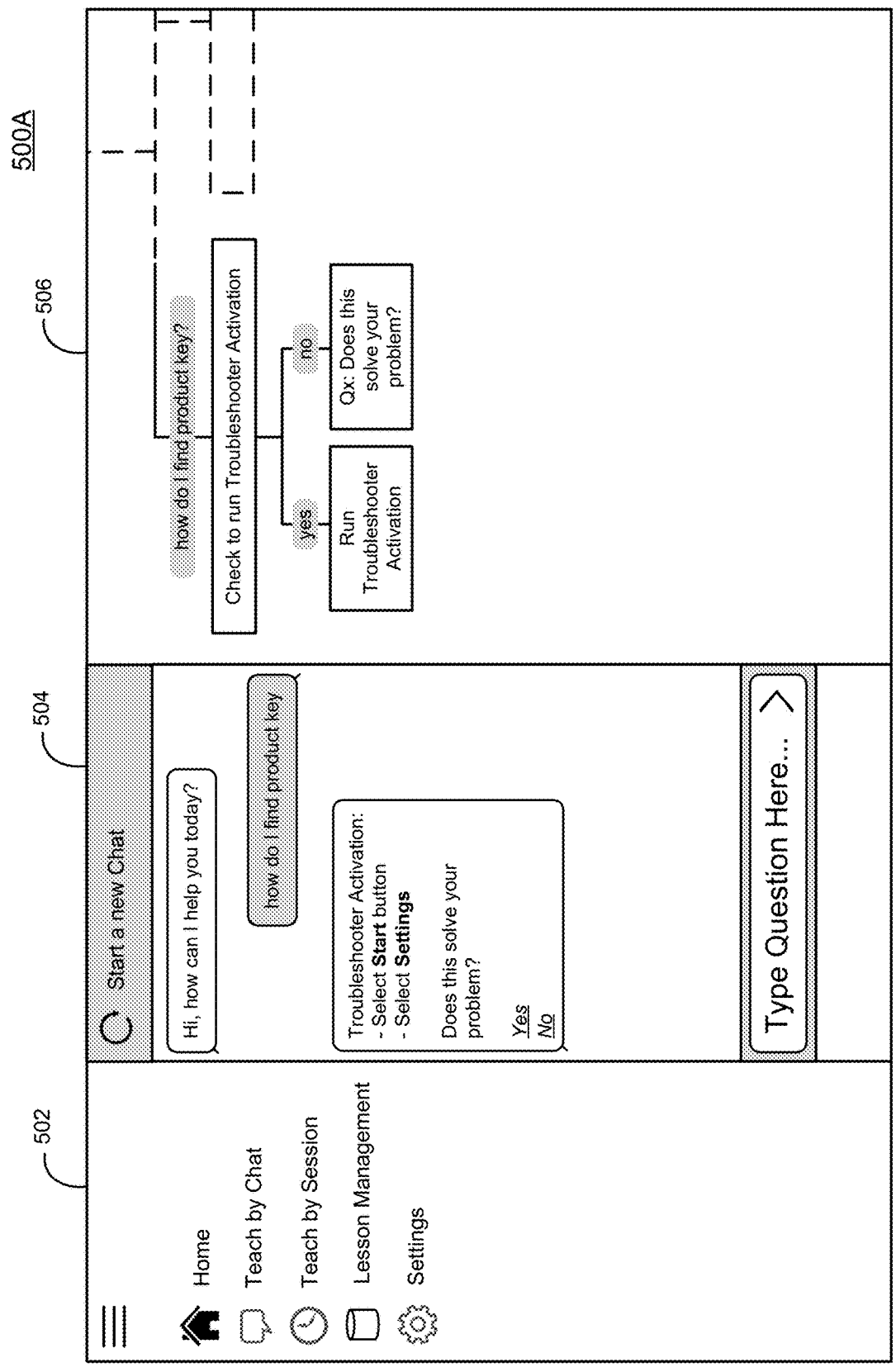
FIGS. 5A-5C illustrate screens for interacting and training an artificial conversational entity of an artificial intelligence (AI) based dialog bot training and communications system, according to an example.
Figure 5B:
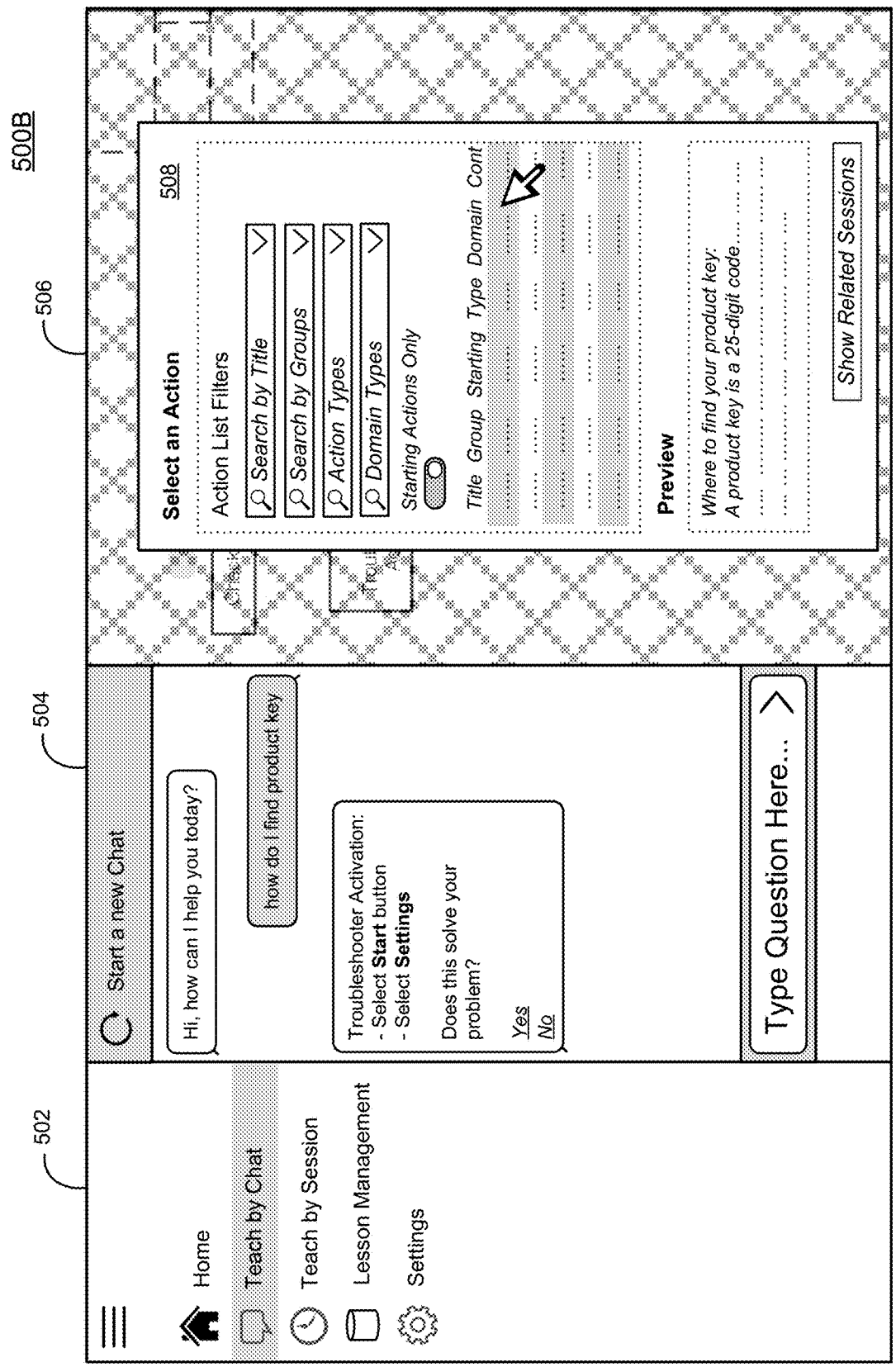
Figure 5C:
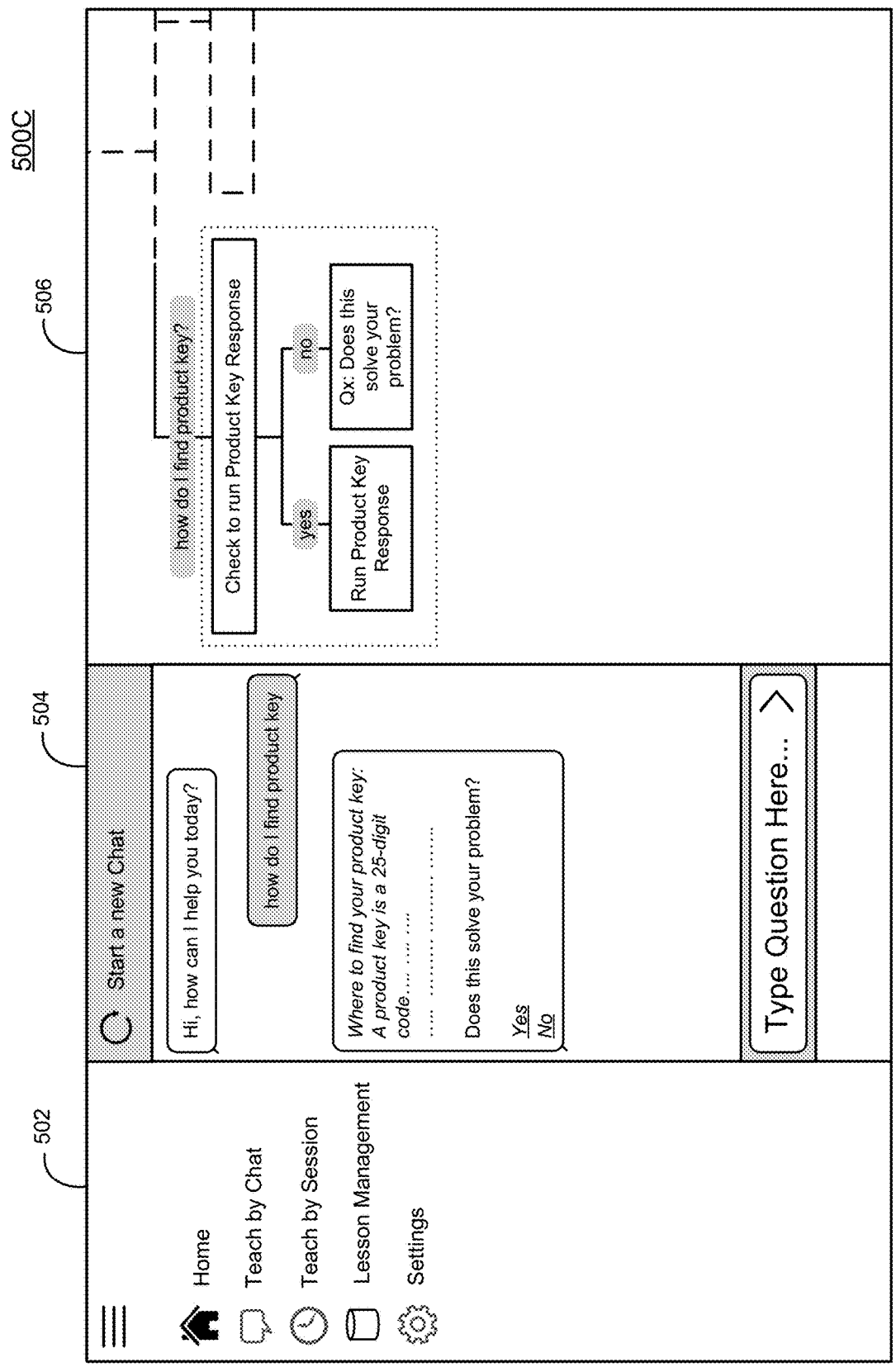

FIGS. 5A-5C illustrate screens 500A-500C for interacting and training an artificial conversational entity of an artificial intelligence (AI) based dialog bot training and communications system 100, according to an example. It should be appreciated that these screens 500A-500C may depict screens for dialog bot training; however, the user interface may be similar to what any user may see during a real-time dialog bot conversation.

In FIG. 5A, a screen 500A for dialog bot training may be shown. In menu panel 502, there may be options, such as "Home," "Teach by Chat," "Teach by Session," "Lesson Management," and "Settings," for a user (e.g., editor) to select. The dialog panel 504 may replicate the dialog bot experience. Here, the dialog bot may initiate a new chat with the user to which a user may type in his or her question or query. As shown, the dialog bot may begin the conversation with an introduction, such as "Hi, how can I help you today?" in response, the user may enter "how do i find product key." Note that the editing experience is very similar to that of any normal conversation a user may have with the dialog bot. In this scenario, the dialog bot may respond to the user's query with "Troubleshooter Activation" and some instructions as to what it believes will solve the user's problem, and concludes with "Does this solve your problem?" for the user to reply.

It is clear in this example that the response provided by the dialog bot is suboptimal and does not answer the user's questions regarding product key. The script panel 506 may provide a flow chart of the script or dialog tree that shows how the dialog bot took that query and mapped it to the current response. Because the response is suboptimal, the editor may teach or retrain the dialog bot to provide a better response.

In some examples, the flow chart of the script or dialog tree may be depicted as an action graph visualization. The action graph visualization may be provided to help visualize the actions with their relationship and make the curated knowledge interpretable and editable. In some examples, the action visualization graph may allow editors to visualize where they are in a conversation and what future potential action branches are based on possible user queries. The graph may be constructed from lessons in memory and/or action content. It should be appreciated that the action graph visualization may be provided with the chat feature or separately and distinctly from the chat feature. Either way, the action graph visualization may allow editors easily peruse action graphs generated from the lessons they taught. Editors may add, edit, and/or delete lessons, as well as any other editing action, from this view in the script panel 506.

In FIG. 5B, the editor may select "Teach by Chat" in the menu panel 502 to train the dialog bot directly via conversation, as shown. By selecting "Teach by Chat," a training menu 508 may appear. The training menu 508 may provide the editor several ways to retrain the dialog bot. In some examples, the training menu 508 may present a list of action filters and prompt the user to select an action. These may include filtering the actions by at least title, groups, action types, domain types, starting actions, etc. The training menu 508 may include input fields for search functionality, pull-down menus, radio buttons, graphical switches, etc. to allow the user to find a more optimal response than the one that was shown. As the user narrows his or her search with the options provided, a list of these actions may be presented at the training menu 508. The editor may provisionally select various options in order to see a "Preview" of that response at the bottom of the training menu 508. In this case, an editor may find a response that directly answers the initial question about product key and it will be shown in the preview portion of the training menu 508. It should also be appreciated that a "Show Related Sessions" button or link may also be presented to help the editor find other responses.

Once the editor finds and selects the optimal response, the dialog bot may now present this response in the dialog panel 504, as shown in FIG. 5C. What is also shown is an updated dialog tree or script in the script panel 506, which now shows how a question related to product key would be rerouted to this particular response.

It should be appreciated that examples shown in FIGS. 5A-5C depict only some of the features, other various functions not shown may include use of custom dictionaries, back end scoring of responses, training outside of chat, such as through sessions, etc. For example, the menu panel 502 may allow an editor to train the dialog bot using sessions, manage various lessons stored in memory, as well as provide other settings to fine-tune dialog bot responses or other user preferences.

Figure 6:
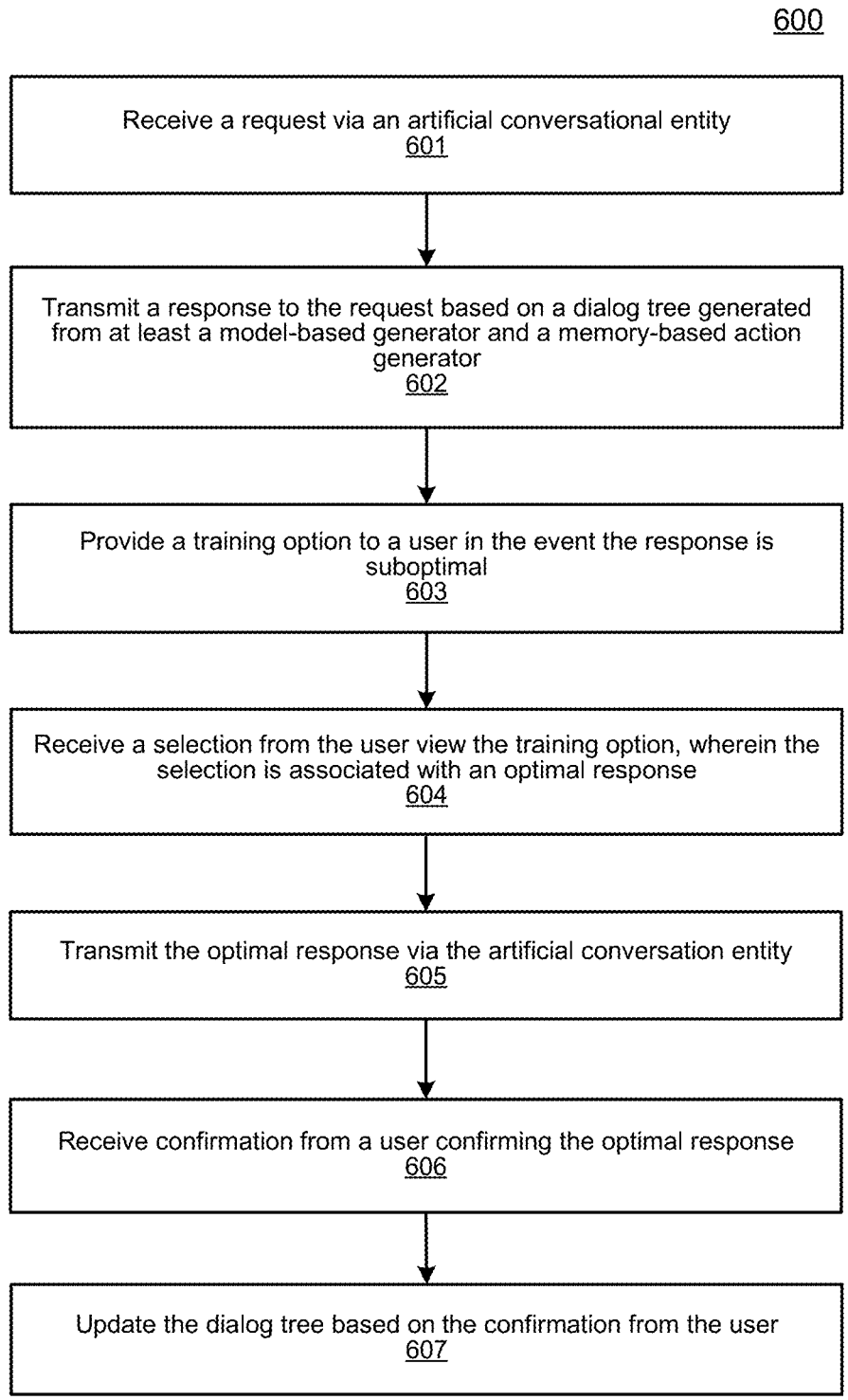
FIG. 6 illustrates a flow chart of a method for training an artificial conversational entity using an artificial intelligence (AI) based dialog bot training and communications system, according to an example.

FIG. 6 illustrates a flow chart of a method 100 for training of an artificial conversational entity using an artificial intelligence (AI) based dialog bot training and communications system 100, according to an example. The method 600 is provided by way of example, as there may be a variety of ways to carry out the method described herein. Although the method 600 is primarily described as being performed by system 100 as shown in FIG. 1, the method 600 may be executed or otherwise performed by other systems, or a combination of systems. Each block shown in FIG. 6 may further represent one or more processes, methods, or subroutines, and one or more of the blocks may include machine-readable instructions stored on a non-transitory computer readable medium and executed by a processor or other type of processing circuit to perform one or more operations described herein.

At block 601, the AI-based dialog bot training and communications system 100 may receive a request 102 via an artificial conversational entity. In some examples, the request may be parsed for conversational context 106 using a data processing technique by an embedding model subsystem 108, as described herein. For instance, the embedding model subsystem may associate a numerical vector with the request based on the data processing technique. In some examples, the data processing technique may include caching, natural language processing (NLP), intent triggering, or other technique.

At block 602, the AI-based dialog bot training and communications system 100 may transmit a response 120 to the request based on a dialog tree generated from at least a model-based action generator 112 and a memory-based action generator 114. In some examples, the model-based action generator 112 may apply a similarity comparison technique to compare the numerical vector associated with the request to a model-based action value to determine strength of the response. As described herein, the similarity comparison technique may include cosine similarity, classification, or other comparison technique. In some examples, the memory-based action generator 114 may collect and average a plurality of stored lessons and compare the numerical vector associated with the request to determine strength of the response.

At block 603, the AI-based dialog bot training and communications system 100 may provide a training option to a user in the event the response is suboptimal. The response may be identified as suboptimal by a user or when the similarity comparisons yield a comparison value that is less than a predetermined threshold.

At block 604, the AI-based dialog bot training and communications system 100 may receive a selection from the user via the training option. In some examples, the selection may be associated an optimal response.

At block 605, the AI-based dialog bot training and communications system 100 may transmit the optimal response via the artificial conversational entity.

At block 606, the AI-based dialog bot training and communications system 100 may receive confirmation from a user confirming the optimal response. Here, the optimal response may be stored for future use by the memory-based action generator 114, and for future comparison purposes.

At block 607, the AI-based dialog bot training and communications system 100 may update the dialog tree based on the confirmation from the user.

Figure 7:
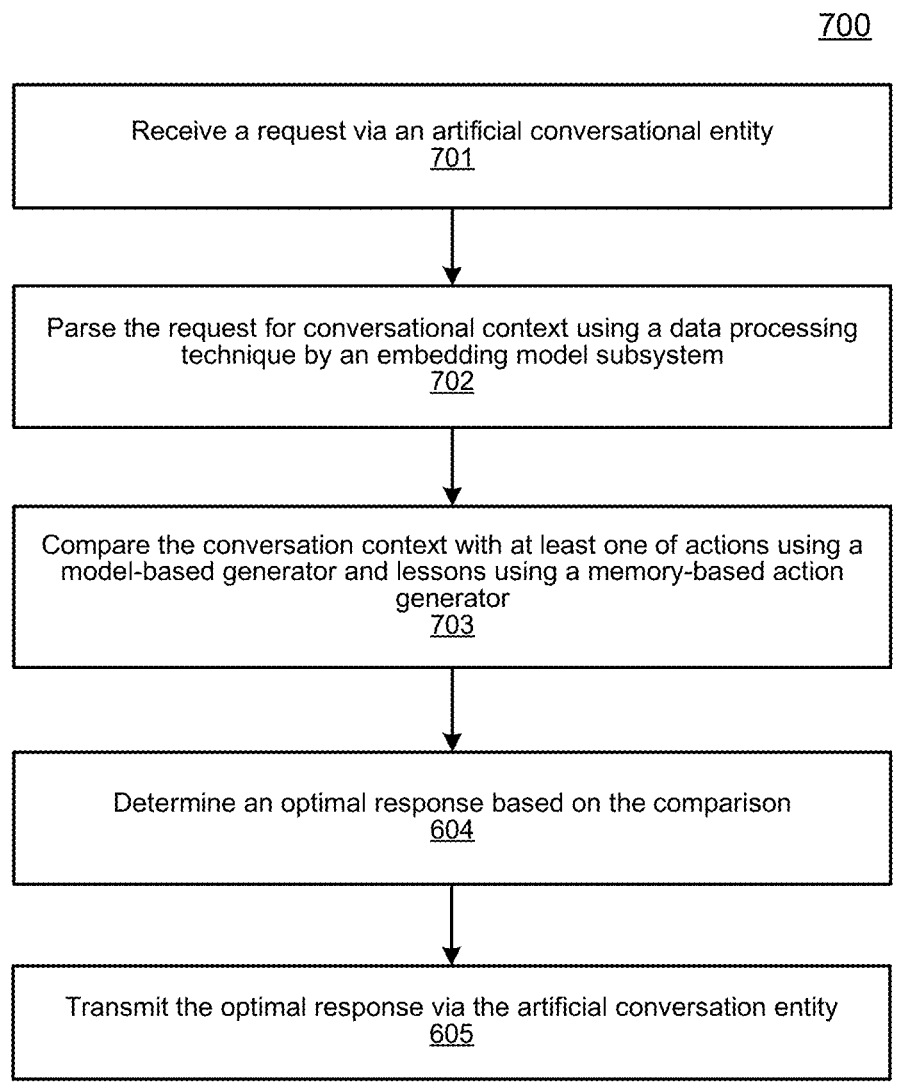
FIG. 7 illustrates a flow chart of a method for providing an artificial conversational entity using an artificial intelligence (AI) based dialog bot training and communications system, according to an example.

FIG. 7 illustrates a flow chart of a method 700 for providing an artificial conversational entity using an artificial intelligence (AI) based dialog bot training and communications system 100, according to an example. The method 700 is provided by way of example, as there may be a variety of ways to carry out the method described herein. Although the method 700 is primarily described as being performed by system 100 as shown in FIG. 1, the method 600A may be executed or otherwise performed by other systems, or a combination of systems. Each block shown in FIG. 7 may further represent one or more processes, methods, or subroutines, and one or more of the blocks may include machine-readable instructions stored on a non-transitory computer readable medium and executed by a processor or other type of processing circuit to perform one or more operations described herein.

At block 701, the AI-based dialog bot training and communications system 100 may receive a request from a user via an artificial conversational entity. The request may be parsed by a context preprocessor 106 for conversational context.

At block 702, the AI-based dialog bot training and communications system 100 may use a data processing technique, via an embedding model subsystem 108, to understand the contextual context. In some examples, the embedding model subsystem 108 may associate a numerical vector with the request based on the data processing technique. In some examples, the data processing technique may include caching, natural language processing (NLP), intent triggering, or other technique.

At block 703, the AI-based dialog bot training and communications system 100 may compare the conversation context with at least one of actions using a model-based action generator 112 and lessons using a memory-based action generator 114. In some examples, the model-based action generator 112 may apply a similarity comparison technique to compare the numerical vector associated with the request to a model-based action value to determine strength of the response. As described herein, the similarity comparison technique may include cosine similarity, classification, or other comparison technique. In some examples, the memory-based action generator 114 may collect and average a plurality of stored lessons and compare the numerical vector associated with the request to determine response strength.

At block 704, the AI-based dialog bot training and communications system 100 may determine an optimal response based on the comparison.

At block 705, the AI-based dialog bot training and communications system 100 may transmit the optical response to the user via the artificial conversational entity.

Dialog bot training and deployment may involve processing data. Data may be multimodal. Audio or visually-oriented data (e.g., a digital image video), for example, may require additional processing. For instance, this may also include processing metadata associated with that digital image. As needed, pattern recognition may be applied during image processing to detect a particular object or pattern in the image. Different types of conventional machine learning functions may be used for pattern recognition.

According to various examples, the system 100 may build and train multiple machine learning classifiers as well. These may include convolutional neural networks (CNNs). The machine learning classifiers may perform image/textual processing to detect particular attributes of interested images/text. Such attributes may be used for image/textual matching to identify visual or textual content. It should be appreciated that "visual" or "image" data, as described herein, may also include textual data, audio data, or video data as well. In other words, "visual data processing" or "image processing," as used herein, may include, without limitation, processing and analysis of multimodal information. For example, this may include processing of textual, audio, video, or other similar data in addition to the actual visual or image data.

Referring back to convolutional neural networks (CNNs), CNNs may include many layers to detect, parse, and understand data, e.g., intent or meaning of data. Furthermore, each layer of the CNN may have a multitude of parameters associated with it. Specific values of those parameters for a successful and accurate data classification may not be known a priori. The system 100, according to various examples, may provide a method for building and training CNNs to output an accurate classification of data for purposes of creating intuitive artificial conversational entities or dialog bots.

Multiple CNNs may be built and trained by a machine learning processing system. According to an example, a CNN built and trained by a machine learning processing system may include a CNN. The CNN may identify and determine one or more phrases and match against other similar phrases or characters to determine meaning, context, or intent. Together with other data sources, such as dictionaries, thesaurus, reference materials, etc., a more robust and self-learning system may be provided to better understand user queries and provide natural AI-based responses.

As discussed in more detail herein, the CNN may be able to identify particular attributes of the data which may be used for dialog bot creation and deployment. This may be particular helpful in understanding meaning of user queries and other processing and analysis. Furthermore, the CNN may operate in real-time or near real-time to facilitate accurate matching or classification objects from data. Accordingly, together with natural language processing (NLP) and/or other processing techniques, a machine learning processing system may be used to create and deploy a human-like experience in an artificial conversational entity.

Other helpful applications may be provided by the examples described herein. For example, natural language processing (NLP) and auto-tagging may be provided. The NLP and auto-tagging may be used to enhance textual processing and user query intent determinations. For example, the processing systems described herein may be "trained" by submission of more training data, e.g., gathered from similar dialog bot creation and interaction. Using user intent and the additional search attributes, the system may perform enhanced processing and matching as well as an auto-tagging process. Once a sufficient amount of data is obtained from one or more users, the system may also use that information to acquire other information from third party sources to build a data library. All of this may enhance dialog bot creation and interaction. Accordingly, the system described herein may facilitate an improved and interactive method for training and deploying artificial conversational entities and improve user experience and service.

It should also be appreciated that the AI-based interactive dialog bot training and communications system 100 may also provide other components not shown. These may include gateways, servers, or other interfaces that may perform and run analytics in order to decrease time, expense in data delivery, and perhaps even taking immediate action at equipment. In many ways, the system 100 may then provide real-time or near real-time analytics to simplify the analytics process and increase responsiveness and efficiency.

It should be appreciated that the components of the system 100 described herein may operate in partial or full capacity, or it may be removed entirely. It should also be appreciated that data analytics and processing techniques described below with respect to the analytics system, for example, may also be performed partially or in full by other various components of the overall system.

Although applications described herein are directed mainly to creation and deployment of dialog bots, it should be appreciated that that the systems may also use these and other various techniques in content-based recommendation engines, advertisements, market research, law enforcement, supply chain management and operations, dynamic risk analysis, and other types of knowledge management systems. The AI-based interactive dialog bot training and communications systems described herein may provide a more comprehensive, flexible and efficient approach to providing enhanced user experience and service using AI-based techniques.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system, comprising:
a memory storing machine readable instructions; and
a processor to execute the machine readable instructions to:
receive a request via an artificial conversational entity;
determine a context-aware embedding value based on context processing of the request, where the context-aware embedding value represents a context of a running conversation with the artificial conversational entity;
determine, by a model-based action generator, a first set of candidate actions associated with the request based on a comparison of the context-aware embedding value to embedded values having associated actions;
determine, by a memory-based action generator, a second set of candidate actions associated with the request based on a comparison of the context-aware embedding value to lessons stored in memory and completed via an interactive teaching interface;
select an action from the first set and the second set of candidate actions based on confidence scores generated for the first set and the second set of candidate actions;
transmit a response to the request based on the selected action;
provide a training option to a user, via the interactive teaching interface, in the event the response is suboptimal;
receive an optimal response selection from the user via the interactive teaching interface; and
update a dialog tree with the optimal response.

2. The system of claim 1, further comprising:
transmit the optimal response via the artificial conversational entity; and
receive confirmation from the user confirming the optimal response, wherein the update to the dialog tree is performed based on the confirmation from the user.

3. The system of claim 1, wherein the request is parsed for conversational context using a data processing technique by an embedding model subsystem.

4. The system of claim 3, wherein the embedding model subsystem associates a numerical vector, comprising the context-aware embedding value, with the request based on the data processing technique.

5. The system of claim 3, wherein the data processing technique comprises at least one of caching, natural language processing (NLP), and intent triggering.

6. The system of claim 1, wherein the model-based action generator applies a similarity comparison to compare the context-aware embedding value to the embedded values to determine the first set of candidate actions associated with the request.

7. The system of claim 6, wherein the similarity comparison comprises at least one of cosine similarity and classification.

8. The system of claim 1, wherein the memory-based action generator collects and averages a plurality of the stored lessons for the comparison of the context-aware embedding value to the lessons.

9. The system of claim 1, wherein the processor is to:
save the optimal response in the memory as one of the stored lessons, wherein the memory-based action generator generates a future response to a future request based on the optimal response stored in the memory as one of the stored lessons.

10. The system of claim 1, wherein to receive the optimal response selection, the processor is to:
invoke training of the artificial conversational entity subsequent to the providing of the training option to the user;
receive, during the training, a plurality of interactions from the user via the interactive teaching interface as if the user was interacting with the artificial conversational entity via the interactive teaching interface during a non-training session; and
saving the plurality of interactions in the dialog tree for the update of the dialog tree.

11. A computer-executed method, comprising:
receiving, at an artificial conversation entity hosted over a network, a request;
determining a context-aware embedding value based on context processing of the request, where the context-aware embedding value represents a context of a running conversation with the artificial conversational entity;
determining, by a model-based action generator, a first set of candidate actions associated with the request based on a comparison of the context-aware embedding value to embedded values having associated actions;
determining, by a memory-based action generator, a second set of candidate actions associated with the request based on a comparison of the context-aware embedding value to lessons stored in memory and completed via an interactive teaching interface;
selecting an action from the first set and the second set of candidate actions based on confidence scores generated for the first set and the second set of candidate actions;
transmitting a response to the request based the selected action;
providing a training option to a user in the event the response is suboptimal;
receiving a selection from the user via the training option, wherein the selection is associated with an optimal response;
transmitting the optimal response via the artificial conversational entity;

receiving confirmation from the user confirming the optimal response; and updating a dialog tree based on the confirmation from the user.

12. A non-transitory computer-readable storage medium having an executable stored thereon, which when executed instructs a processor to perform the method of claim 11.

13. A system, comprising:

a memory storing machine readable instructions; and a processor to execute the machine readable instructions to:

receive a request via an artificial conversational entity;

parse the request for conversational context using a data processing technique by an embedding model subsystem;

determine a context-aware embedding value based on the parse of the request, where the context-aware embedding value represents a context of a running conversation with the artificial conversational entity;

determine, by a model-based action generator, a first set of candidate actions associated with the request based on a comparison of the context-aware embedding value to embedded values having associated actions;

determine, by a memory-based action generator, a second set of candidate actions associated with the request based on a comparison of the context-aware embedding value to lessons stored in memory and completed via an interactive teaching interface;

select an action from the first set and the second set of candidate actions based on confidence scores generated for the first set and the second set of candidate actions;

compare the conversation context with at least one of actions using a model-based action generator and lessons using a memory-based action generator;

determine an optimal response based on the comparison; and transmit the optimal response to a user via the artificial conversational entity;

provide a training option to a user, via the interactive teaching interface, in the event the response is suboptimal;

receive an optimal response selection from the user via the interactive teaching interface; and update a dialog tree with the optimal response.

14. The system of claim 13, wherein the embedding model subsystem associates the context-aware embedding value with the request based on the data processing technique.

15. The system of claim 14, wherein the data processing technique comprises at least one of caching, natural language processing (NLP), and intent triggering.

16. The system of claim 13, wherein the model-based action generator applies a similarity comparison to compare the context-aware embedding value to the embedded values to determine the first set of candidate actions associated with the request.

17. The system of claim 16, wherein the similarity comparison comprises at least one of cosine similarity and classification.

18. The system of claim 14, wherein the memory-based action generator collects and averages a plurality of the stored lessons for the comparison of the context-aware embedding value to the lessons.

19. A computer-executed method, comprising:

receiving, at an artificial conversation entity over a network, a request from a user;

parsing the request for conversational context using a data processing technique by an embedding model subsystem;

determining a context-aware embedding value based on the parsing of the request, where the context-aware embedding value represents a context of a running conversation with the artificial conversational entity;

determining, by a model-based action generator, a first set of candidate actions associated with the request based on a comparison of the context-aware embedding value to embedded values having associated actions;

determining, by a memory-based action generator, a second set of candidate actions associated with the request based on a comparison of the context-aware embedding value to lessons stored in memory and completed via an interactive teaching interface;

selecting an action from the first set and the second set of candidate actions based on confidence scores generated for the first set and the second set of candidate actions;

transmitting the response to the user via the artificial conversational entity;

providing a training option to a user, via the interactive teaching interface, in the event the response is suboptimal;

receiving an optimal response selection from the user via the interactive teaching interface; and updating a dialog tree with the optimal response.

20. A non-transitory computer-readable storage medium having an executable stored thereon, which when executed instructs a processor to perform the method of claim 19.

* * * * *